United States Patent
Harayama et al.

(10) Patent No.: US 7,835,008 B2
(45) Date of Patent: Nov. 16, 2010

(54) GYRO EMPLOYING SEMICONDUCTOR LASER

(75) Inventors: Takahisa Harayama, Kyoto (JP); Takehiro Fukushima, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 789 days.

(21) Appl. No.: 10/591,453

(22) PCT Filed: Mar. 2, 2005

(86) PCT No.: PCT/JP2005/003525

§ 371 (c)(1),
(2), (4) Date: Jul. 18, 2007

(87) PCT Pub. No.: WO2005/085759

PCT Pub. Date: Sep. 15, 2005

(65) Prior Publication Data

US 2008/0037027 A1    Feb. 14, 2008

(30) Foreign Application Priority Data

Mar. 3, 2004    (JP) .............................. 2004-059402

(51) Int. Cl.
G01C 19/72    (2006.01)
(52) U.S. Cl. .................................................. 356/460
(58) Field of Classification Search .............. 356/460, 356/461
See application file for complete search history.

(56) References Cited

U.S. PATENT DOCUMENTS

| 4,792,962 | A  | * | 12/1988 | Miyauchi et al. ............... 372/94 |
| 6,351,311 | B1 | * | 2/2002  | Numai ....................... 356/472 |
| 6,445,454 | B1 | * | 9/2002  | Numai ....................... 356/459 |
| 6,631,002 | B1 | * | 10/2003 | Numai ....................... 356/461 |
| 2002/0021732 | A1 | * | 2/2002 | Numai ......................... 372/94 |

(Continued)

FOREIGN PATENT DOCUMENTS

JP    60-148185    8/1985

(Continued)

OTHER PUBLICATIONS

International Preliminary Report on Patentability and Written Opinion of The International Searching Authority issued in International Application No. PCT/JP2005/003525, dated Mar. 2, 2005.

(Continued)

*Primary Examiner*—Patrick J Connolly
(74) *Attorney, Agent, or Firm*—McDermott Will & Emery LLP

(57) ABSTRACT

A semiconductor laser gyro including a photodetector and a semiconductor laser 10 that emits first and second laser lights. The photodetector is disposed in a position where interference fringes are formed by the first and second laser lights. The semiconductor laser 10 includes an active layer as well as first and second electrodes 13 and 14 for injecting carriers into the active layer. The first laser light is one obtained through emission of a part of laser light (L1) that circulates on a polygonal path in the active layer. The second laser light is one obtained through emission of a part of laser light (L2) that circulates on the polygonal path in the opposite direction to the laser light (L1).

19 Claims, 14 Drawing Sheets

U.S. PATENT DOCUMENTS

| | | | |
|---|---|---|---|
| 2002/0048023 A1* | 4/2002 | Numai | 356/459 |
| 2004/0202222 A1* | 10/2004 | Pocholle et al. | 372/75 |
| 2008/0037027 A1* | 2/2008 | Harayama et al. | 356/468 |
| 2009/0073452 A1* | 3/2009 | Feugnet et al. | 356/459 |

FOREIGN PATENT DOCUMENTS

| | | |
|---|---|---|
| JP | 60-148185 A | 8/1985 |
| JP | 4-174317 | 6/1992 |
| JP | 7-022675 | 1/1995 |
| JP | 7-22675 A | 1/1995 |
| JP | 7-131123 | 5/1995 |
| JP | 7-131123 A | 5/1995 |
| JP | 11-351881 | 12/1999 |
| JP | 2000-121367 A | 4/2000 |
| JP | 2000-230831 | 8/2000 |
| JP | 2000-230831 A | 8/2000 |
| JP | 2001-124564 | 5/2001 |
| JP | 2001-124564 A | 5/2001 |
| JP | 2002-344079 | 11/2002 |
| JP | 2002-344079 A | 11/2002 |
| JP | 2002-344080 | 11/2002 |
| JP | 2002-344080 A | 11/2002 |

OTHER PUBLICATIONS

Japanese Office Action, with English translation, issued in Japanese Patent Application No. 2004-059402, mailed Jan. 5, 2010.

Fukushima, T., et al., "Ring and axis mode lasing in quasi-stadium laser diodes with concentric end mirrors", Optics Letters, Aug. 15, 2002, pp. 1430-1932, vol. 27 No. 16.

* cited by examiner

GYRO EMPLOYING SEMICONDUCTOR LASER

RELATED APPLICATION

This application is a national phase of PCT/JP2005/003525 filed on Mar. 2, 2005, which claims priority from Japanese Application No. 2004-059402 filed on Mar. 3, 2004, the disclosures of which Applications are incorporated by reference herein. The benefit of the filing and priority dates of the International and Japanese Applications is respectfully requested.

TECHNICAL FIELD

The present invention relates to a gyro employing a semiconductor laser.

BACKGROUND ART

There are gyros for detecting angular velocity of a rotating object. Among them, an optical gyro is characterized by high accuracy. In the optical gyro, angular velocity is detected using the difference in frequency between two laser lights that travel in the opposite directions to each other on a ring-shaped path. An optical gyro employing a rare gas laser has been proposed as such an optical gyro (see, for example, JP11 (1999)-351881A). Such an optical gyro allows interference fringes to be formed by extracting laser lights that circulate on the same path in the opposite directions to each other. A general configuration of such an optical gyro is shown in FIG. 16. In the optical gyro shown in FIG. 16, the interference fringes are expressed by the following Formula (1):

$$I = I_0 \left[ 1 + \cos\left( \frac{2\pi \varepsilon \chi}{\lambda} + 2\pi \Delta \omega t + \phi \right) \right] \quad (1)$$

In the above formula, $I_o$ denotes the light intensity of laser light, while $\lambda$ indicates the wavelength of the laser light. Furthermore, $\in$ denotes the angle shown in FIG. 16, while $\chi$ indicates a coordinate in the X direction shown in FIG. 16. Moreover, $\Delta\omega$ denotes the difference in frequency between a clockwise mode and an anticlockwise mode, which occurs when the gyro rotates. In addition, t indicates time. The difference $\Delta\omega$ is proportional to the angular velocity $\Omega$ of the rotation of the gyro. In other words, $\Delta\omega=4A\Omega/(L\lambda)$, where A denotes the area surrounded by a ring shape, while L indicates an optical path length. Furthermore, $\phi$ denotes the initial phase difference between two laser lights. In this gyro, its rotational speed and rotation direction are detected through the detection of the moving speed and direction of interference fringes. The optical gyro employing a rare gas laser, however, has problems in that it requires high voltage for its drive, which results in great power consumption, and it is large and is susceptible to heat.

A gyro that employs a semiconductor ring laser provided with a ring-shaped (triangular ring, quadrilateral ring, etc.) waveguide has been proposed as a gyro that solves such problems (see, for example, JP2000-230831A). The semiconductor laser that is used in this gyro includes a ring-shaped waveguide with an approximately constant width. In the gyro, two laser lights that circulate on the ring-shaped waveguide in the opposite directions to each other are extracted and the interference fringes formed thereby are detected. However, laser lights confined using a narrow waveguide spread widely when going out of the waveguide. It therefore is difficult to detect the interference fringes practically with high accuracy. Hence, common gyros in which a semiconductor laser is employed are: a gyro that detects the beat frequency corresponding to the difference in frequency between two laser lights based on the change in voltage between two electrodes of the semiconductor laser (see, for example, JP4(1992)-174317A); and a gyro that detects the beat frequency using evanescent light that has leaked out of the end face of a resonator (see, for example, JP2000-121367A).

However, the gyro that detects the beat frequency requires an extra device for detecting the rotation direction.

DISCLOSURE OF INVENTION

With such a situation in mind, one of the objects of the present invention is to provide a semiconductor laser gyro that can detect rotation easily with higher accuracy as compared to conventional gyros employing a semiconductor laser, through the use of a semiconductor laser with a new configuration.

The inventors found out that a semiconductor laser with a particular configuration allows particular laser light to be excited. In this semiconductor laser, two laser lights that travel on a rhombic path in the opposite directions to each other are excited. These two laser lights each are emitted from the semiconductor laser in a well-collimated state and then form clear interference fringes. The present invention is based on this new finding.

A semiconductor laser gyro (or a semiconductor laser gyro device) of the present invention includes a photodetector and a semiconductor laser that emits first and second laser lights. The photodetector is disposed in a position where an interference fringe is formed by the first and second laser lights. The semiconductor laser includes an active layer as well as first and second electrodes for injecting a carrier into the active layer. The first laser light is one obtained through emission of a part of laser light (L1) that circulates on a polygonal path in the active layer. On the other hand, the second laser light is one obtained through emission of a part of laser light (L2) that circulates on the polygonal path in an opposite direction to the laser light (L1).

The present invention makes it possible to provide a semiconductor laser gyro with a small size and higher accuracy. The gyro of the present invention employs a semiconductor laser with a particular configuration. This semiconductor laser emits two laser lights that travel on a ring-shaped optical path in the opposite directions to each other, in a well-collimated state. Furthermore, this semiconductor laser causes less degradation of laser lights at the emission end face. The two laser lights therefore form clear interference fringes and thereby the rotational speed (angular velocity) can be detected with higher accuracy. Furthermore, the gyro of the present invention can determine the rotational speed and rotation direction easily by observing the movement of the interference fringes using at least two light-sensitive elements. In order to detect them, a circuit analogous to those that are used in conventional optical gyros employing a rare gas laser can be used. Accordingly, the gyro of the present invention is readily applicable to various apparatuses.

DESCRIPTION OF THE PREFERRED EMBODIMENTS

Figure 1:
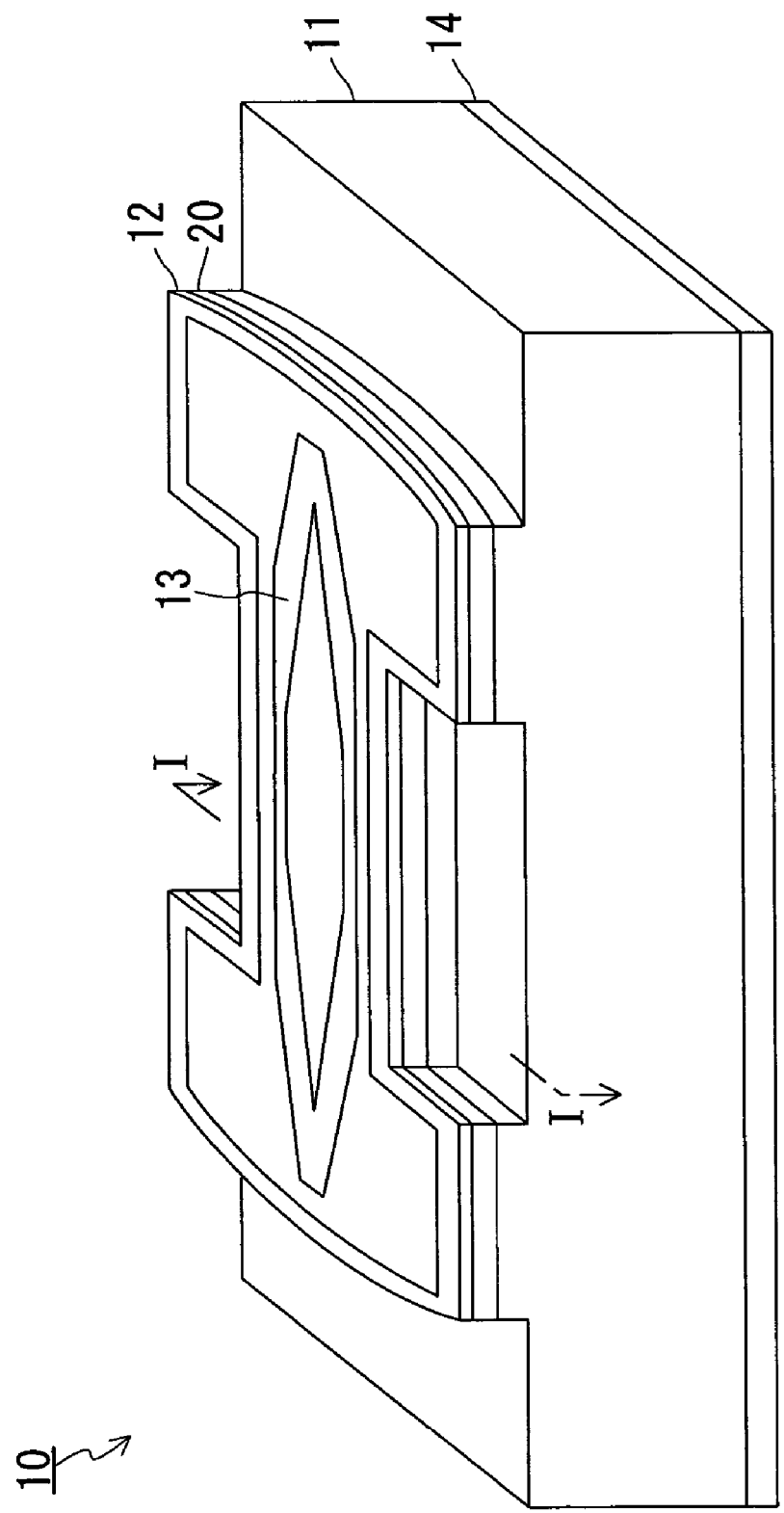
FIG. 1 is a perspective view that schematically shows an example of the semiconductor laser that is used in the semiconductor laser gyro of the present invention.

The following description is directed to an embodiment of the present invention. The semiconductor laser gyro (a semiconductor laser gyro device) described below is an example of the present invention. The present invention therefore is not limited by the following description. Furthermore, in the following description, the identical parts may be indicated with the identical numbers and characters and the same description may not be repeated in some cases.

The semiconductor laser gyro of the present invention includes a photodetector and a semiconductor laser that emits first and second laser lights. The photodetector is disposed in a position where interference fringes are formed by the first and second laser lights. The semiconductor laser includes an active layer as well as first and second electrodes for injecting carriers into the active layer. The first laser light is one obtained through emission of a part of laser light (L1) that circulates on a polygonal path in the active layer. On the other hand, the second laser light is one obtained through emission of a part of laser light (L2) that circulates on the above-mentioned path in the opposite direction to the laser light (L1).

The planar shape of the active layer is a shape that includes the above-mentioned polygon in such a manner that the corners of the polygonal path are positioned at the outer periphery thereof. When current is injected into the active layer, light is generated. This light, however, is reflected by the end faces of the active layer and thereby induced emission occurs. Then, the laser lights (L1 and L2) that circulate stably on a particular path are excited according to the planar shape of the active layer. That is, the active layer functions as a resonator (a cavity). The end faces of the active layer that functions as a resonator are formed so that generated lights circulate on a path with a specific shape. For instance, when laser lights that circulate on a rhombic path are to be excited, the end faces (side faces) of the active layer are formed in the positions corresponding to the respective four corners of the path (the hypothetical rhombus). Generally, the active layer and cladding layers that are disposed to sandwich the active layer are uniform layers. Accordingly, a waveguide with a constant width such as the one corresponding to the above-mentioned path is not formed. The shape of the polygonal path can be changed according to the shape of the active layer. The shape of the polygonal path is preferably a rhombus but may be another quadrangle or triangle.

Semiconductor Laser

First, the semiconductor laser that is used for the gyro of the present invention is described.

Preferably, the planar shape of the active layer of the semiconductor laser is not ring-shaped (polygonal ring-shaped). Since laser light confined in a narrow waveguide formed in the ring-shape spreads when being emitted, clear interference fringes are not formed. Accordingly, it is preferable that the planar shape of the active layer be substantially not ring-shaped. In this case, carriers are injected into the active layer, so that laser light of a particular mode that is generated using the active layer extending in a two-dimensional direction as a resonator, specifically laser light that circulates in the active layer, can be obtained. Laser light to be emitted from such an active layer has been collimated well and therefore the half-value width of its intensity can be 10° or less (for instance, 5° or less). Even when having a through hole formed in the vicinity of its center, the active layer can be employed as long as it is an active layer that is substantially not ring-shaped, i.e. an active layer in which a waveguide with an approximately constant width is not formed in the ring-shape. In this specification, the term "planar shape" denotes the shape shown in FIG. 3, i.e. a shape formed in the direction perpendicular to the direction in which the semiconductor layers are stacked.

In a gyro that employs a conventional semiconductor laser in which laser light circulates on a triangular ring path or quadrilateral ring path, the planar shape of its cavity (active layer) is triangular ring or quadrilateral ring corresponding to the path of the laser light. On the other hand, the planar shape of the active layer according to the present invention is not polygonal ring. It extends two-dimensionally in such a manner as to include the path of the laser lights.

Preferably, the polygonal path is a rhombic path and the active layer has first to fourth end faces that are formed in positions corresponding to first to fourth corners of the rhombic path. In other words, the first to fourth corners of the rhombic path are located on the first to fourth end faces, respectively. In this case, through injection of carriers into the active layer, the laser lights that circulate on the rhombus are excited. That is, the laser light (L1) is one that circulates on the rhombic path, while the laser light (L2) is one that circulates on the rhombic path in the opposite direction to the laser light (L1).

Preferably, at least one electrode selected from the first and second electrodes and a semiconductor layer of the semiconductor laser are in contact with each other along the rhombic path (the polygonal path). Current is injected through the region where they are in contact with each other. This configuration allows carriers to be injected into the portion of the active layer corresponding to the rhombic path. Accordingly, the two laser lights (L1 and L2) that circulate on the rhombic path are excited easily. In a typical example, the at least one electrode is in contact with the semiconductor layer in such a manner as to substantially correspond to the rhombic path (the polygonal path). In these cases, the at least one electrode and the semiconductor layer may contact with each other at ring-shaped region. In this specification, the expression "in such a manner as to substantially correspond to the rhombic path" denotes not only the case where the at least one electrode is in contact with the semiconductor layer in such a manner as to correspond perfectly to the rhombic path but also the case where the at least one electrode is in contact with the semiconductor layer in such a manner as to correspond to at least 50% (preferably at least 70%, more preferably at least 90%) of the rhombic path. In addition, the expression "contact at ring-shaped region" denotes that the region where they are in contact with each other is not necessarily a perfectly continuous ring, so long as it substantially forms a ring. The area of the above-mentioned region corresponding to the rhombic path is normally 50% or smaller, for example, 30% or smaller than that of the planar shape of the active layer.

At least one electrode selected from the first and second electrodes may include: a first part into which current that allows a gain to be obtained is injected; and a second part into which a smaller current than that to be injected into the first part is injected. Current that is required for laser oscillation is injected into the first part. On the other hand, a smaller current is injected to the second part so as to generate no gain. This makes it possible to attenuate laser lights that travel in directions other than the rhombic optical path.

Preferably, internal angles of the first and second corners that oppose each other on the rhombic path are smaller than those of the third and fourth corners, and both the first and second laser lights are emitted from the first end face that is formed in a position corresponding to the first corner. More specifically, it is preferable that the first and second laser lights be emitted from one end in the longitudinal direction of the active layer that functions as a cavity. The diagonal line extending between the first corner and the second corner is not parallel with the first and second lasers.

Preferably, the active layer satisfies a condition under which the laser light (L1) and the laser light (L2) are reflected totally by the third and fourth end faces. The first to fourth end faces function as mirror surfaces. When the laser lights are reflected totally by the third and fourth end faces, the threshold of laser oscillation can be lowered. In order to allow the laser lights to be reflected totally by the third and fourth end faces, angles that are formed between the third and fourth end faces and the laser lights (L1 and L2) that enter them, respectively, are set at a certain angle or smaller. The angle required for the total reflection is derived easily from the wavelengths of the laser lights and the refractive index of the active layer. The angles that are formed between the end faces of the active layer and the laser lights can be adjusted by changing the shape of the rhombic path, i.e. changing the planar shape of the active layer. A preferable shape varies according to the wavelengths of the laser lights and the material of the active layer. However, the ratio of the distance between the first corner and the second corner (the length of the longer diagonal line of the rhombus) versus the distance between the third corner and the fourth corner (the length of the shorter diagonal line of the rhombus) is in the range of 600:190 to 600:30, for example. Although the first end face is a mirror surface, it usually is not subjected to, for example, a mirror coating treatment so that a part of the laser lights that circulate in the active layer is emitted outside the layer. The first end face may be subjected to a treatment that allows laser lights to be emitted easily outside the layer. In addition, it is preferable that the end face of the active layer where the second corner is located have been subjected to the mirror coating treatment.

Preferably, the first end face of the active layer is a curved surface. Particularly, it is preferable that the first and second end faces be convex surfaces that curve outwards, respectively. This configuration allows not only laser lights that circulate on the rhombic path to be generated stably but also the first and second laser lights to be emitted stably from the first end face. Preferably, the two convex surfaces that curve outwards each are identical to a curved surface of a part of a hypothetical column having its center on the diagonal line extending between the first and second corners of the rhombic path. Furthermore, at least one selected from the first and second end faces also can be a plane surface or a convex surface that curves inwards.

Preferably, the radius of the above-mentioned column, i.e. the curvature radius R1 of the first end face and the curvature radius R2 of the second end face each are equal to or longer than the distance L between the first corner and the second corner. With this configuration, the laser lights (L1 and L2) that circulate on the rhombic path can be excited reliably. The upper limits of the curvature radii R1 and R2 are not particularly set. For example, the curvature radii R1 and R2 are twice the distance L or shorter.

It is preferable that the active layer include a first region including the rhombic path and a second region that adjoins the first region. In this case, the planar shape of the first region is preferably an approximately rectangular shape. More specifically, it is preferably a rectangular shape whose shorter sides are convex surfaces that curve outwards. With this configuration, laser lights that travel on the rhombic optical path are excited, with the first region serving as a resonator. In addition, this configuration allows the laser lights that travel in the directions other than the rhombic path to be attenuated by the second region.

Figure 3:
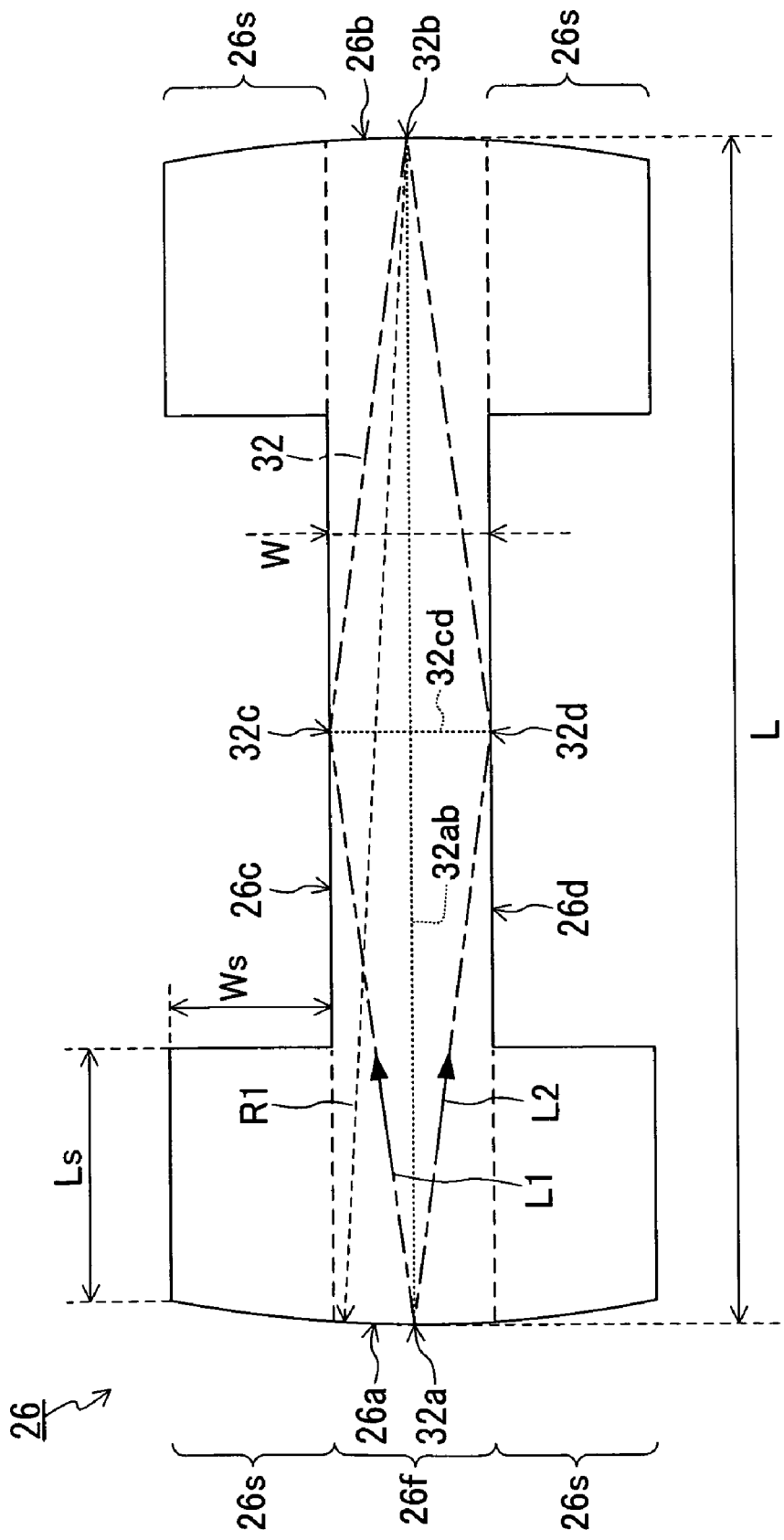
FIG. 3 is a schematic view showing a planar shape of an active layer of the semiconductor laser shown in FIG. 1.

Preferably, the planar shape of the active layer that is formed of the first region and the second region is approximately the shape of a letter H (more specifically, the shape of a letter H elongated widthwise) (see FIG. 3). In this case, four second regions adjoin the first region. In this case, it is preferable that a formula of $L/4<Ls$ holds, where Ls denotes the length (μm) of the second region in a direction parallel to the diagonal line extending between the first corner and the second corner, while L indicates the distance (μm) between the first corner and the second corner. Furthermore, the length Ws of each second region in a direction parallel to the diagonal line extending between the third corner and the fourth corner is in the range of 1 to 3 times the distance W between the third corner and the fourth corner, for example (see FIG. 3).

The semiconductor and the layered structure that are employed in the semiconductor laser of the present invention are not particularly limited. They can be selected according to, for instance, the wavelengths of the laser lights to be used therein. The wavelengths of the laser lights (L1 and L2) are not particularly limited. However, shorter wavelengths thereof allow the angular velocity of the rotation to be detected with higher accuracy. Preferable wavelengths are 1550 nm or shorter, particularly 900 nm or shorter. An example of the material for the semiconductor layer is a group III-V semiconductor.

Figure 2:
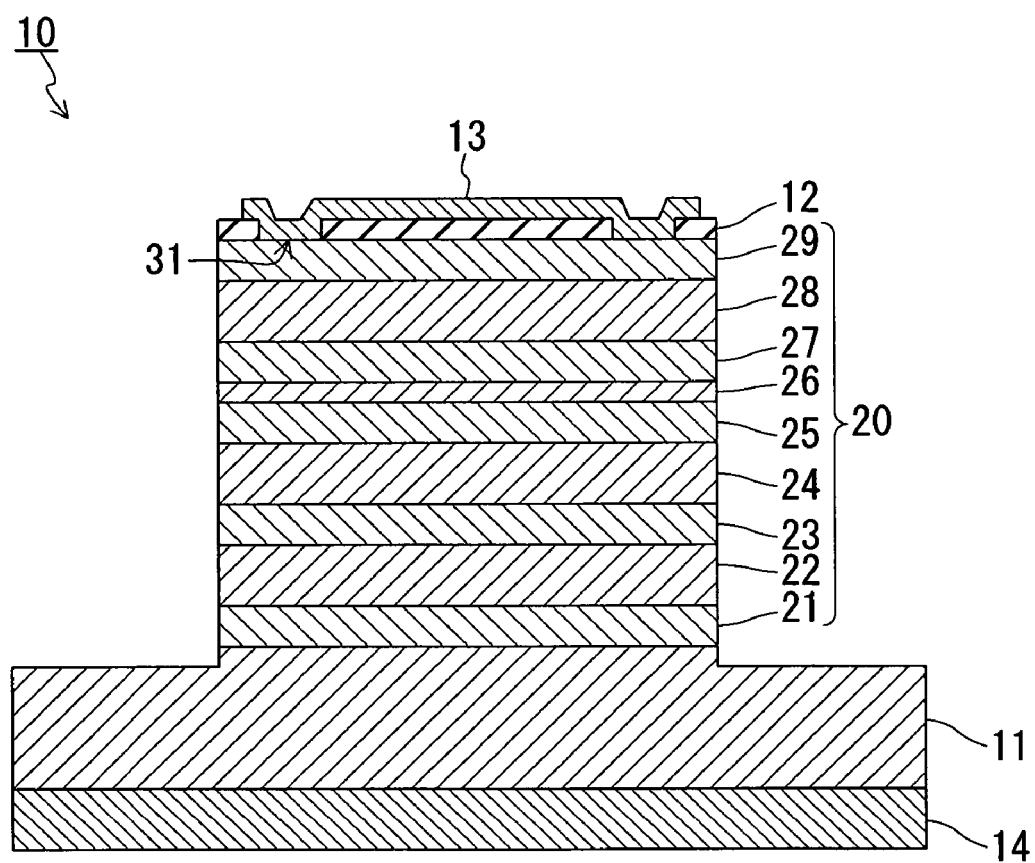
FIG. 2 is a cross-sectional view that schematically shows the semiconductor laser shown in FIG. 1.

A preferable example of the semiconductor laser that is used in the present invention is described below. FIG. 1 shows a perspective view of an example of the semiconductor laser. FIG. 2 shows a cross-sectional view taken along line I-I shown in FIG. 1. The drawings that are used for explaining the present invention are schematic ones. The respective parts are shown on scales changed for easy understanding.

A semiconductor laser 10 shown in FIG. 1 includes a substrate 11, a semiconductor layer 20 formed on the substrate 11, an insulating layer 12 and a first electrode 13 that are formed on the semiconductor layer 20, and a second electrode 14 that is formed on the whole back surface of the substrate 11.

With reference to FIG. 2, the semiconductor layer 20 includes a buffer layer 21, a buffer layer 22, a graded layer 23, a cladding layer 24, a graded layer 25, an active layer 26, a graded layer 27, a cladding layer 28, and a cap layer 29, which are stacked sequentially from the substrate 11 side. The patterned insulating layer 12 is formed on the cap layer 29. In addition, the first electrode 13 is formed on the insulating layer 12. Since a through hole is formed in the insulating layer 12, the first electrode 13 and the cap layer 29 are in contact with each other in a region 31 where the through hole is formed.

Figure 4:
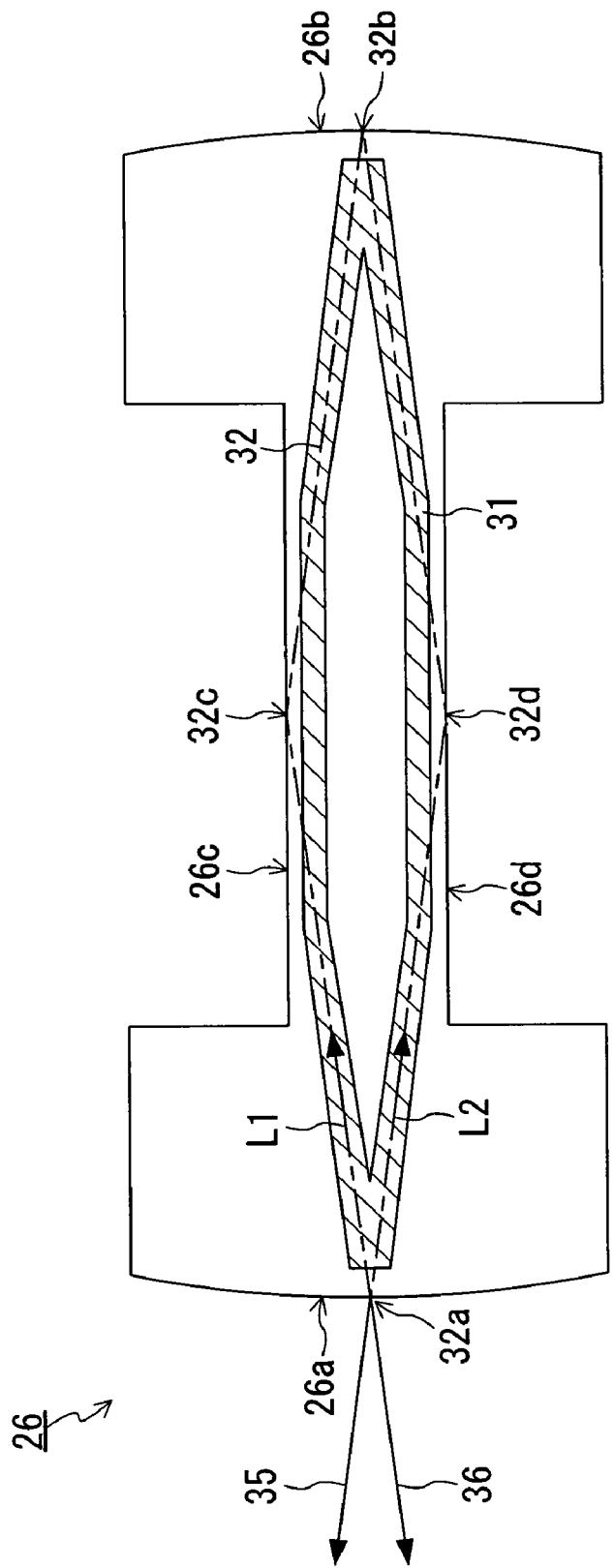
FIG. 4 is a diagram that illustrates the function of the semiconductor laser shown in FIG. 1.

FIGS. 3 and 4 show planar shapes of the active layer 26 of the semiconductor laser 10 viewed from above. In FIG. 4, the region 31 in which the first electrode 13 and the semiconductor layer 20 (the cap layer 29) are in contact with each other is indicated with oblique lines. The semiconductor layer 20 has the same planar shape as that of the active layer 26.

With reference to FIG. 3, the active layer 26 is a thin film formed in the shape of a sheet including a rhombic path 32. The path 32 includes first to fourth corners 32a to 32d. Among them, the first and second corners 32a and 32b are smaller in angle than the third and fourth corners 32c and 32d. The active layer 26 includes first to fourth end faces (mirror surfaces) 26a to 26d that are arranged in such a manner as to include the corners 32a to 32d. The first and second end faces 26a and 26b are convex surfaces that curve outwards. On the other hand, the third and fourth end faces 26c and 26d are flat surfaces.

The active layer 26 includes a first region 26f and four second regions 26s that adjoin the first region. The planar shape of the first region 26f is a rectangular shape whose shorter sides are convex surfaces that curve outwards. The path 32 is formed in the first region 26f. The active layer 26 that is formed of the first region 26f and the second regions 26s has approximately the shape of a letter H (more specifically, the shape of a letter H elongated widthwise).

With reference to FIG. 4, the region 31 where the first electrode 13 and the cap layer 29 are in contact with each other is formed into an approximately rhombic shape so as to correspond to the path 32. The reason why the region 31 is not corresponding perfectly to the path 32 is because there is a limitation in manufacturing process in forming the through hole in the insulating layer 12. The region 31 can be formed into a rhombic shape by a well-known method so as to correspond perfectly to the path 32, but complicated manufacturing processes are required.

When voltage is applied between the first electrode 13 and the second electrode 14 to inject carriers into the active layer 26, lights are generated in the active layer 26. These lights are confined by the graded layers and the cladding layers and thereby travel mainly in the active layer 26. Among such lights, lights that travel on the path 32 are reflected by the end faces 26a to 26d and thereby induced emission occurs. Thus, a laser light L1 that circulates on the path 32 that serves as an optical path is generated. Similarly, a laser light L2 is generated that circulates in the opposite direction to the laser light L1 on the path 32 that serves as an optical path. Parts of the laser lights L1 and L2 that are emitted from the first corner 32a of the first end face 26a are the first and second laser lights 35 and 36 (see FIG. 4).

In order to reduce the loss of the laser lights L1 and L2, the end face 26b is mirror-coated with a dielectric multilayer film. The distance L (see FIG. 3) between the first corner 32a and the second corner 32b is 600 μm. The distance W between the third corner 32c and the fourth corner 32d is 60 μm. In the semiconductor laser 10, the laser lights (L1 and L2) are reflected totally by the end faces 26c and 26d.

The four second regions 26s are formed to prevent the occurrence of a mode that occurs when laser light generated in the first region 26f is subjected to multiple reflections at the end faces 26c and 26d. In the semiconductor laser 10, the length Ls (see FIG. 3) of the second regions 26s in the direction parallel to the diagonal line 32ab extending between the first corner 32a and the second corner 32b is 160 μm. On the other hand, L/4 is 150 μm. Thus L/4<Ls is satisfied. Accordingly, particularly the above-mentioned mode is prevented from occurring. The length Ws of the second regions 26s in the direction of the diagonal line 32cd extending between the third corner 32c and the fourth corner 32d is 70 μm.

The end faces 26a and 26b each have a shape of part of a curved surface of a column. Specifically, the shape is identical to that of part of the curved surface of a column whose center axis is positioned on the diagonal line 32ab and is positioned perpendicularly to the surface of the active layer 26. The radius of the column, i.e. the curvature radius R1 (see FIG. 3) of the end face 26a is 600 μm, while the curvature radius R2 (not shown in the drawings) of the end face 26b also is 600 μm. The semiconductor laser 10 has a shape that is symmetrical about the diagonal line 32ab and the diagonal line 32cd. The end face 26b is symmetrical in shape to the end face 26a about the diagonal line 32cd extending between the third corner 32c and the fourth corner 32d. The semiconductor laser of the present invention, however, does not necessarily need to have a shape of line symmetry. For instance, the end face 26b may be a curved surface whose curvature is different from that of the end face 26a, may be a flat surface, or may be a convex surface that curves inwards.

Table 1 indicates the materials and thicknesses of the substrate 11, the semiconductor layer 20, the insulating layer 12, the first electrode 13, and the second electrode 14. In Table 1, a band gap Eg as well as majority carrier and the concentration thereof also are indicated with respect to some of the semiconductor layers.

TABLE 1

| Layer | Composition | Thickness [μm] | Eg [eV] | Majority Carrier and its Concentration [cm$^{-3}$] |
|---|---|---|---|---|
| First Electrode 13 | Au | 0.6 | — | — |
| | Pt | 0.05 | | |
| | Ti | 0.07 | | |
| Insulating Layer 12 | Si$_3$N$_4$ or SiO$_2$ | 0.4 | — | — |
| Cap Layer 29 | Be-doped P-Type GaAs | 0.2 | 1.41 | Hole: $1 \times 10^{19}$ |

TABLE 1-continued

| Layer | Composition | Thickness [μm] | Eg [eV] | Majority Carrier and its Concentration [cm$^{-3}$] |
|---|---|---|---|---|
| Cladding Layer 28 | Be-doped P-Type Al$_{0.5}$Ga$_{0.5}$As | 1.5 | 2.0 | Hole: in the order of 10$^{18}$ |
| Graded layer 27 | Be-doped P-Type Al$_X$Ga$_{1-X}$As | 0.202 | | |
| Active Layer 26 | Nondoped GaAs | 0.01 | | |
| Graded Layer 25 | Si-doped N-Type Al$_X$Ga$_{1-X}$As | 0.202 | | |
| Cladding Layer 24 | Si-doped N-Type Al$_{0.5}$Ga$_{0.5}$As | 1.5 | 2.0 | Electron: in the order of 10$^{18}$ |
| Graded Layer 23 | Si-doped N-Type Al$_X$Ga$_{1-X}$As | 0.2 | | Electron: in the order of 10$^{18}$ |
| Buffer Layer 22 | Si-doped N-Type Al$_{0.2}$Ga$_{0.8}$As | 1.0 | 1.7 | Electron: 1 × 10$^{18}$ |
| Buffer Layer 21 | Si-doped N-Type GaAs | 0.2 | 1.41 | Electron: 3 × 10$^{18}$ |
| Substrate 11 | Single Crystal N-Type GaAs | | | |
| Second Electrode 14 | Ni | 0.02 | — | — |
| | Ge | 0.1 | | |
| | Au | 0.5 | | |

The respective layers that form the first electrode 13 and the second electrode 14 may have been alloyed by a heat treatment. The configuration indicated in Table 1 is an example and is changed suitably according to the characteristics that are required for the semiconductor laser.

The buffer layers 21 and 22 as well as the graded layer 23 are formed to obtain high quality group III-V semiconductor crystals.

The composition ratio X of aluminum of the graded layer 23 increases gradually from the buffer layer 22 side toward the cladding layer 24 side. Specifically, the composition ratio X is 0.2 at the interface between the graded layer 23 and the buffer layer 22, while it is 0.5 at the interface between the graded layer 23 and the cladding layer 24.

In the graded layer 25, the concentration of Si that is a dopant decreases gradually from the cladding layer 24 side to the active layer 26 side. Specifically, it is about 1×10$^{18}$ cm$^{-3}$ at the interface between the graded layer 25 and the cladding layer 24, while it is about 1×10$^{17}$ cm$^{-3}$ at the interface between the graded layer 25 and the active layer 26. Furthermore, the composition ratio X of aluminum of the graded layer 25 also decreases parabolically from the cladding layer 24 side toward the active layer 26 side. Specifically, the composition ratio X is 0.5 at the interface between the graded layer 25 and the cladding layer 24, while it is 0.2 at the interface between the graded layer 25 and the active layer 26.

In the graded layer 27, the concentration of Be that is a dopant increases gradually from the active layer 26 side toward the cladding layer 28 side. Specifically, it is about 1×10$^{17}$ cm$^{-3}$ at the interface between the graded layer 27 and the active layer 26, while it is about 1×10$^{18}$ cm$^{-3}$ at the interface between the graded layer 27 and the cladding layer 28. Furthermore, the composition ratio X of aluminum of the graded layer 27 also increases parabolically from the active layer 26 side toward the cladding layer 28 side. Specifically, the composition ratio X is 0.2 at the interface between the graded layer 27 and the active layer 26, while it is 0.5 at the interface between the graded layer 27 and the cladding layer 28.

Figure 5:
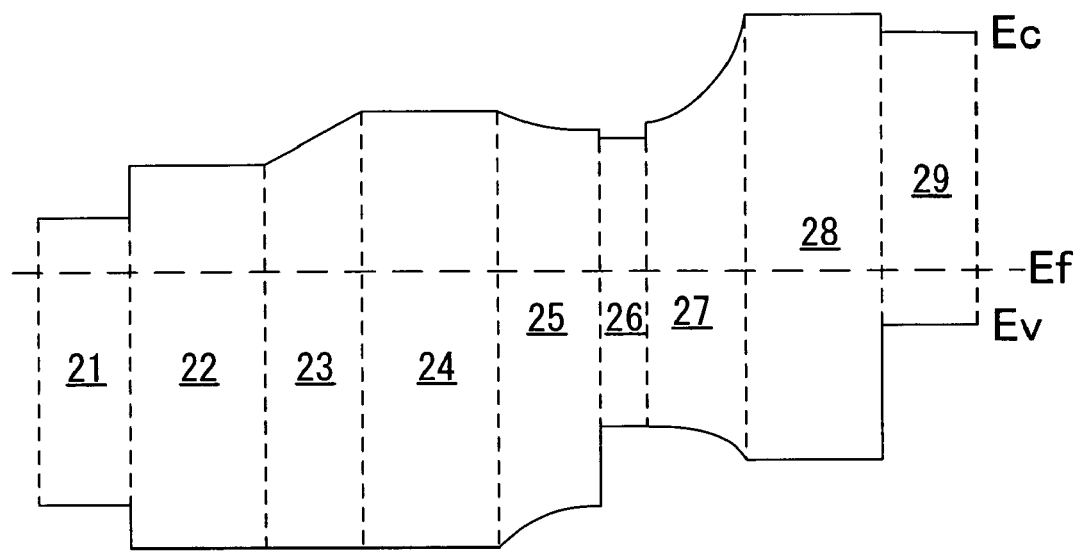
FIG. 5 is a diagram that schematically shows a band gap profile of semiconductor layers of the semiconductor laser shown in FIG. 1.

FIG. 5 schematically shows a band gap profile of the semiconductor layer 20. The band gap of the graded layer 25 decreases parabolically from 2.0 eV to 1.7 eV from the cladding layer 24 side toward the active layer 26 side. The band gap of the graded layer 27 increases parabolically from 1.7 eV to 2.0 eV from the active layer 26 side toward the cladding layer 28 side.

The semiconductor laser 10 is a so-called "single quantum well laser". In the semiconductor laser 10, carriers injected from the two electrodes are confined in the active layer 26 and thereby laser oscillation starts with a lower threshold current. The active layer 26 may be of another type such as a multiple quantum well type.

Figure 6:
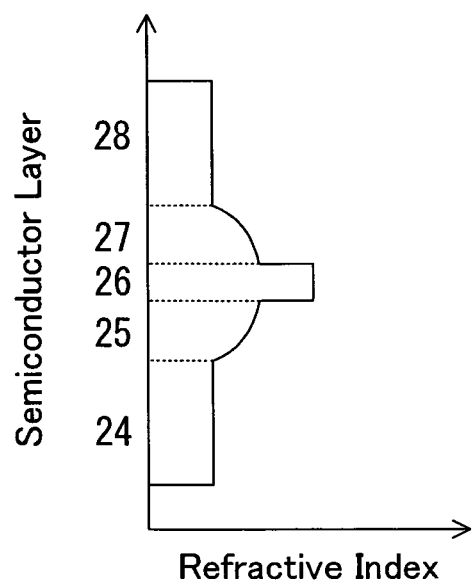
FIG. 6 is a diagram that schematically shows refractive indices of the vicinity of the active layer of the semiconductor laser shown in FIG. 1.

FIG. 6 schematically shows the change in refractive index from the cladding layer 24 to the cladding layer 28. The cladding layer 24, the graded layer 25, the graded layer 27, and the cladding layer 28 each are formed of materials with lower refractive indices than that of the active layer 26 so that light is confined in the active layer 26. The active layer 26 has the highest refractive index. Hence, the light generated in the active layer 26 is confined mainly along the active layer 26.

Figure 7:
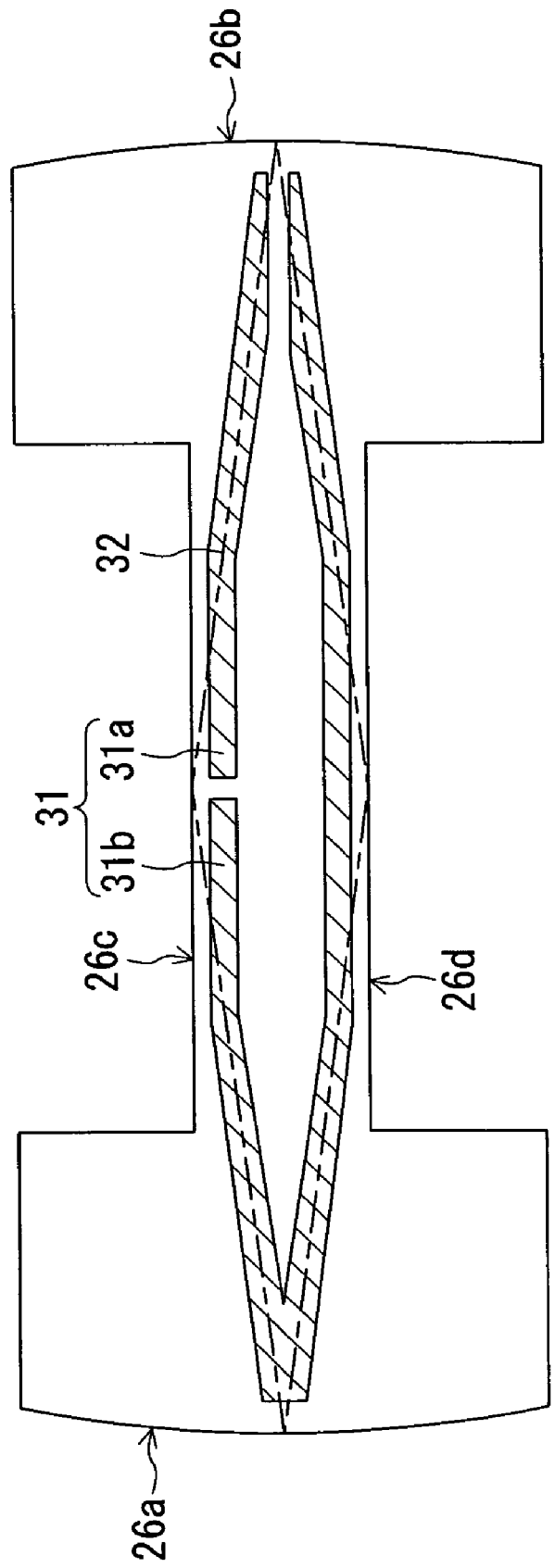
FIG. 7 is a plan view that schematically shows an example of the first electrode.

The first electrode 13 of the semiconductor laser 10 may include: a first part into which current that allows a gain to be obtained is injected; and a second part into which a smaller current than that to be injected into the first part is injected. FIG. 7 shows the relationship among the shapes of the regions where such an electrode and the semiconductor layer 20 (the cap layer 29) are in contact with each other, the planar shape of the active layer 26, and the path 32. In FIG. 7, a region 31a where the first part is in contact with the cap layer 29 and a region 31b where the second part is in contact with the cap layer 29 are indicated by hatching. The region 31a is formed in the place corresponding to one of the sides of the path 32, while the region 31b is formed in the place corresponding to other three of the sides. Such an electrode can be formed easily by changing the shape of the insulating layer 12.

In the semiconductor laser 10, single-mode oscillation starts when the current to be injected exceeds the threshold current. The oscillation mode changes sequentially from a single mode to a twin mode and then a locking mode as the current to be injected further increases from the threshold current. In the single mode, as shown in FIG. 4, the first and second laser lights 35 and 36 are emitted. In the twin mode, two laser lights alternately are emitted periodically. In the locking mode, only one of the two laser lights is emitted. Hence, in the present invention, the semiconductor laser 10 generally is operated in the single mode. Specifically, for example, a current of 200 mA is allowed to flow between the first electrode 13 and the fourth electrode 14 to oscillate the laser. The gyro of the present invention may be provided with special functions by utilizing the fact that the oscillation mode can be changed depending on the current to be injected.

Figure 8:
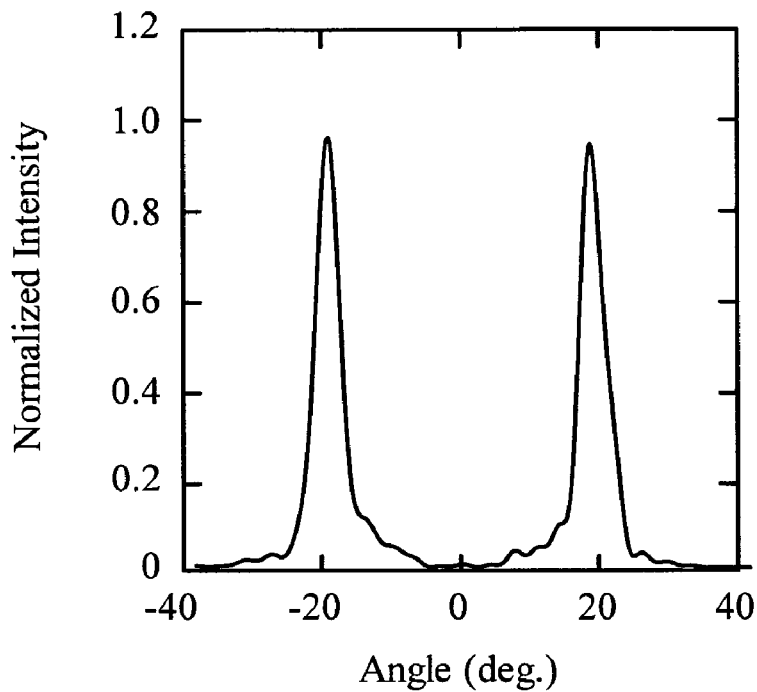
FIG. 8 is a graph showing angular dependency of light intensity of laser lights emitted from the semiconductor laser shown in FIG. 1.

FIG. 8 shows the result of the measurement of angular dependency of the light intensity of laser lights that were obtained when the semiconductor laser 10 was oscillated in the single mode. The measurement was carried out at a distance of approximately 300 mm from the first end face 26a. As shown in FIG. 8, two laser lights whose intensities were approximately equal to each other were emitted in the directions that formed approximately the same angles with the 0° direction (the direction of the diagonal line 32ab). The two laser lights each had a wavelength of 862 nm. The half-value widths of the intensities of the two laser lights were 4.2°. Furthermore, the angles formed between the direction of the diagonal line 32ab and the respective two laser lights each were about 19.2°. As described above, the semiconductor laser 10 emitted two laser lights in the symmetrical directions to the diagonal 32ab. The two laser lights had been collimated well and had intensities that were approximately equal to each other. Conceivably, the angle θ formed between the diagonal line 32ab and the first laser light (or the second laser light) generally is expressed by the following Formula (2):

$$\theta = \pm\sin^{-1}\left(\frac{W \cdot n_{eff}}{\sqrt{L^2 + W^2}}\right) \quad (2)$$

Figure 9:
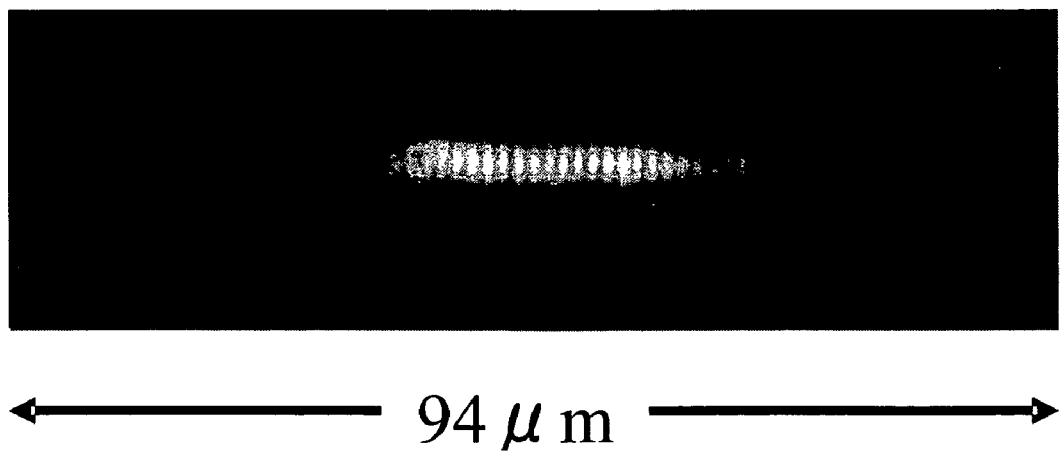
FIG. 9 is a diagram showing interference fringes formed by two laser lights emitted from the semiconductor laser shown in FIG. 1.

In Formula (2), L and W indicate the lengths shown in FIG. 3, respectively, specifically L=600 μm and W=60 μm. In addition, $n_{eff}$ denotes the effective refractive index of the layers, from the cladding layer 24 to the cladding layer 28, that confine light. The semiconductor laser 10 has an effective refractive index of about 3.3. When the value θ was calculated using those values, θ=19.2°, which was in good agreement with the actual result. According to the above-mentioned formula, the emission angles of the first and second laser lights 35 and 36 can be controlled by changing the refractive index of the active layer or the ratio between L and W Two laser lights emitted from the semiconductor laser 10 are superimposed on each other in the vicinity of the end face 26a. Accordingly, regular interference fringes (cosine waves) are generated in the vicinity of the end face 26a. FIG. 9 shows the interference fringes observed in the vicinity of the end face 26a.

Semiconductor Laser Gyro

The gyro of the present invention includes a photodetector disposed in a position where interference fringes are formed by the first and second lasers. The photodetector is not particularly limited as long as it can detect the movement of the interference fringes. Generally, a semiconductor light-sensitive element such as a photodiode, a phototransistor, etc. is used. The photodetector outputs signals according to the magnitude of the light intensity of the interference fringes. When the interference fringes move, the light intensity that is inputted into the photodetector varies periodically. Thus the moving speed of the interference fringes can be calculated.

The photodetector may be a two-channel photodetector that is provided with a plurality of light-sensitive elements. When at least two light-sensitive elements are disposed in the direction in which the interference fringes move, the moving direction of the interference fringes also can be detected in addition to the moving speed of the interference fringes. The rotation direction and the rotational speed of the semiconductor laser gyro can be calculated through detections of the moving speed and the moving direction of the interference fringes.

In the gyro of the present invention, the semiconductor laser and the photodetector (the light-sensitive element) may be formed monolithically. In this case, the semiconductor laser and the photodetector (for instance, a photodiode) may have the same layered structure. In this configuration, the semiconductor laser and the photodetector can be formed simultaneously in a series of processes for manufacturing a semiconductor device. Accordingly, the gyro can be manufactured easily, and the semiconductor laser and the photodetector can be formed in accurate positions.

The gyro of the present invention further may include a lens. In this case, the photodetector is disposed in a position where interference fringes are formed by the first and second laser lights that have passed through the lens. The semiconductor layer of the semiconductor laser and the lens may have the same layered structure. In this case, the lens is, for example, one whose planar shape is semicircle, and the part that functions as a lens is formed of the same semiconductor as that of which the active layer of the semiconductor laser is formed. Accordingly, the light that has entered the lens is absorbed by the lens formed of the semiconductor to be attenuated. In order to prevent such attenuation from occurring, current may be passed through the semiconductor layers stacked to form the lens. In order to pass current, for instance, the semiconductor laser including the electrodes, and the lens may be allowed to have completely the same layered structure. The current to be passed is preferably less than the current that causes laser oscillation. Passing current prevents the lens from attenuating light. Furthermore, in order to prevent the lens from attenuating light, the lens may be formed of a material that absorbs less laser light, for instance, silicon oxide. Even in that case, the lens and the semiconductor laser can be formed monolithically by a well-known method although the number of manufacturing steps increases.

The gyro of the present invention further may include a prism. In this case, the photodetector is disposed in a position where interference fringes are formed by the first and second laser lights that have passed through the prism. The use of a prism with a suitable shape can increase the periodic length of interference fringes to be formed. Thus the movement of interference fringes can be measured further accurately.

When the semiconductor laser gyro includes the prism, the semiconductor laser and the prism may be formed monolithically. In addition, the semiconductor laser, the prism, and the photodetector may be formed monolithically. These configurations allow each device to be formed in a specific position and shape with high accuracy. Furthermore, in this case, the semiconductor layer of the semiconductor laser and the prism may have the same layered structure. Moreover, the semiconductor layer of the semiconductor laser, the semiconductor layer of the photodetector (for instance, a photodiode), and the prism may have the same layered structure. With this configuration, the photodetector and/or the prism can be formed in a series of processes for manufacturing a semiconductor laser.

When the prism is allowed to have the same layered structure as that of the semiconductor layer of the semiconductor laser, laser lights emitted from the semiconductor laser enters the prism formed of a semiconductor to be attenuated. In order to prevent such attenuation from occurring, current may be passed through the semiconductor layers stacked to form the prism. In order to pass current, for instance, the semiconductor laser including the electrodes, and the prism may be allowed to have completely the same, layered structure. The current to be passed is preferably less than the current that causes laser oscillation. Passing current prevents the prism from attenuating light. Furthermore, in order to prevent the prism from attenuating light, the prism may be formed of a material that absorbs less laser light, for instance, silicon oxide. Even in that case, the prism and the semiconductor laser can be formed monolithically by a well-known method although the number of manufacturing steps increases.

With reference to FIG. 4, the principle of the semiconductor laser gyro according to the present invention that utilizes a sagnac effect is described briefly. When the semiconductor laser 10 rotates, the laser light L1 and the laser light L2 are different from each other in period of time required to circulate once on the optical path that is the path 32. Since the speed of light is constant, the frequency difference occurs between the laser light L1 and the laser light 2 when the semiconductor laser 10 rotates, and thereby interference fringes move at a speed corresponding to the frequency difference. The direction in which the interference fringes move changes according to the direction in which the semiconductor laser 10 rotates. Hence, measurement of the moving speed of the interference fringes allows the rotational speed (angular velocity) of the semiconductor laser 10 to be calculated. In addition, detection of the direction in which the interference fringes move allows the direction in which the semiconductor laser rotates to be detected. More specifically, the rotation direction and rotational speed in plane that is parallel to the surface of the active layer 26 can be calculated. As described above, such a principle of optical gyros is a well-known principle and has been used in optical gyros in which a rare gas laser is employed. The semiconductor laser gyro of the present invention therefore can be driven with a well-known drive circuit. Furthermore, information obtained with the gyro can be processed by a well-known method. In addition, when three semiconductor laser gyros of the present invention are used in combination, the rotation direction and the rotational speed can be calculated with respect to all the directions.

The semiconductor laser gyro of the present invention is explained below using examples. In the following embodiments, the first electrode 13 is the electrode shown in FIG. 7. The first electrode 13, however, may be the electrode shown in FIG. 1 or FIG. 4.

Embodiment 1

Figure 10A:
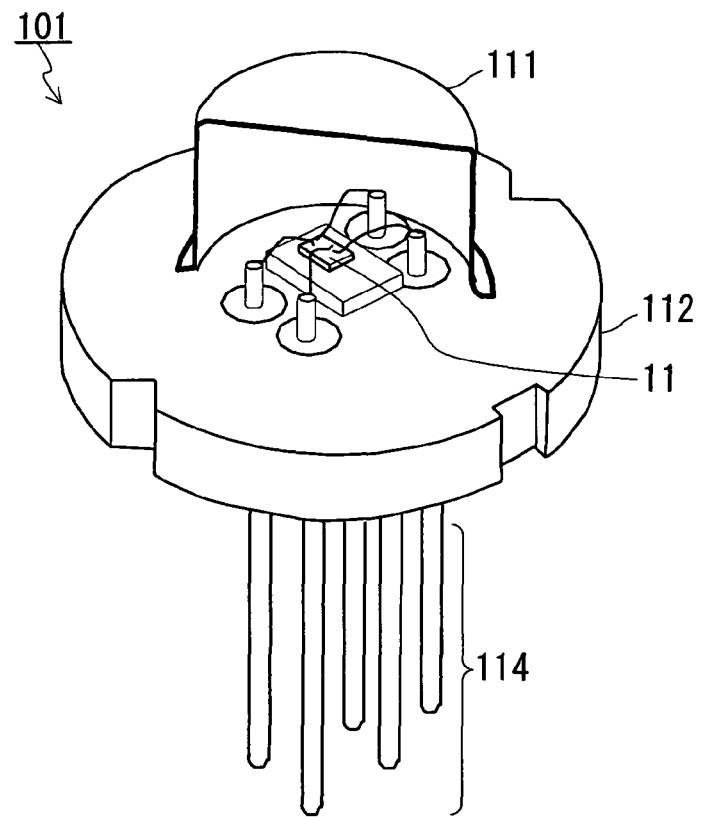
FIG. 10A is a perspective view that schematically shows the whole of an example of the semiconductor laser gyro according to the present invention.
Figure 10B:
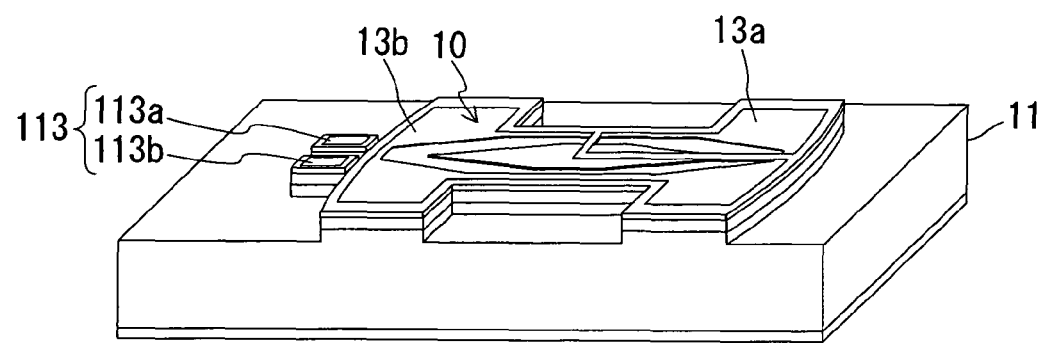
FIG. 10B is a perspective view showing a main part of FIG. 10A.

In Embodiment 1, the description is directed to an example of the semiconductor laser gyro in which a semiconductor laser and a photodetector are formed monolithically. FIG. 10A shows a perspective view of a gyro 101 according to Embodiment 1. In addition, FIG. 10B shows a perspective view of a substrate 11 on which a semiconductor laser 10 and a photodetector 113 (light-sensitive elements 113a and 113b) of the semiconductor laser gyro 101 are formed monolithically. FIG. 10A shows the state where part of the cover 111 has been cut to expose the inner part (the same applies to the following drawings).

With reference to FIG. 10A, the main part of the gyro 101 is packaged (so-called CAN-packaged) with the cover 111 and a stem 112. The gyro 101 includes the stem 112 and the substrate 11 disposed on the stem 112. The semiconductor laser 10 and the light-sensitive elements 113a and 113b are formed monolithically on the same substrate 11. The stem 112 is supported by five electrodes 114. Four of the five electrodes are connected to a first part 13a and a second part 13b of the first electrode 13 of the semiconductor laser 10, the light-sensitive element 113a, and the light-sensitive element 113b, respectively. The remaining one of the five electrodes is a ground electrode that pairs up with the four electrodes. The above-mentioned method of connecting the electrodes 114 is merely an example and therefore the present invention is not limited thereto. The diameter of the round stem 112 is not limited but can be a standardized size, for example, 5.6 mm.

The light-sensitive elements 113a and 113b are photodiodes and have the same layered structure as that of the semiconductor laser 10. The light-sensitive elements 113a and 113b are formed together with the semiconductor laser 10 in the manufacturing process for forming the semiconductor laser 10.

In order to detect the moving direction and moving speed of the interference fringes as shown in FIG. 9, the light-sensitive elements 113a and 113b are disposed in close vicinity to the first end face 26a from which laser lights are emitted. In order to detect the moving speed of the interference fringes with high accuracy, the size of a light-receiving region of the photodetector is determined, with consideration given to the cycle length of the interference fringes and the light-receiving sensitivity of the photodetector. Generally, it is preferable that the size of the light-receiving region be approximately one fifth the cycle length of the interference fringes or smaller.

The semiconductor laser gyro 101 of Embodiment 1 has an advantage of requiring no optical device such as a prism, a lens, etc. On the other hand, in order to obtain the semiconductor laser gyro 101, it is necessary to form minute light-sensitive elements 113a and 113b.

Embodiment 2

Figure 11A:
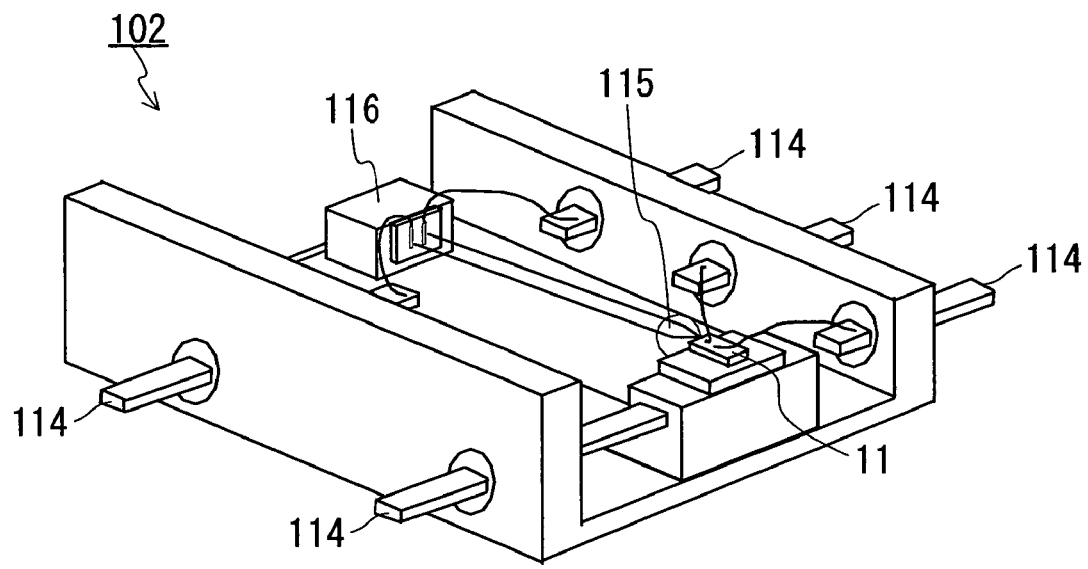
FIG. 11A is a perspective view that schematically shows the whole of another example of the semiconductor laser gyro according to the present invention.
Figure 11B:
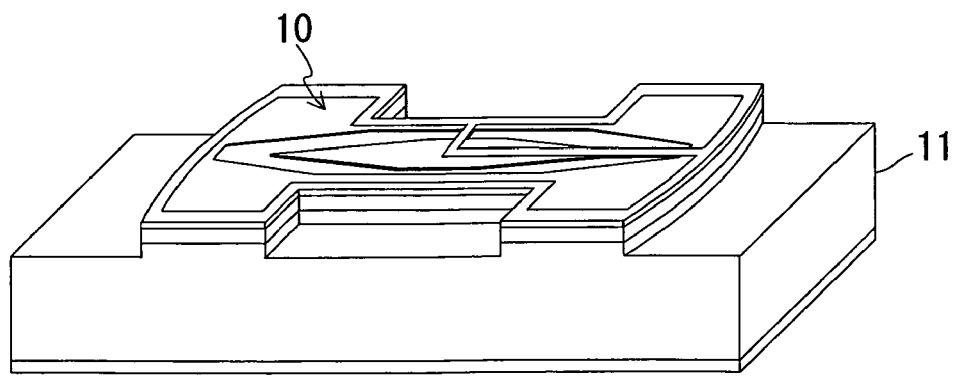
FIG. 11B is a perspective view showing a main part of FIG. 11A.

In Embodiment 2, the description is directed to an example of the semiconductor laser gyro provided with a lens. FIG. 11A shows a perspective view of a gyro 102 according to Embodiment 2. FIG. 11B shows a perspective view of a semiconductor laser 10 that is employed in the gyro 102.

The gyro 102 includes the semiconductor laser 10, a spherical lens 115, and a photodetector 116. The photodetector 116 is a two-channel photodetector provided with two light-sensitive elements. The gyro 102 includes five electrodes 114. The electrodes 114 are connected in the same manner as in the gyro 101.

The spherical lens 115 is disposed so that its focal point is positioned in the vicinity of a laser light emission part (the end face 26a). The photodetector 116 is disposed in a position that is away from the end face 26a by a certain distance (for instance, several centimeters). Accordingly, the gyro 102 has a size of approximately 3 cm×2 cm×1 cm, for example.

Two laser lights emitted from the end face 26a become approximately parallel lights through the spherical lens 115 and then are superimposed on each other to generate interference fringes. The use of the spherical lens 115 can increase the cycle length of the interference fringes. Hence, the movement of the interference fringes can be measured accurately in the gyro 102.

The shape of the spherical lens 115 is not limited to the spherical shape. It may be another shape such as the shape of a thin film, for instance. For example, a thin film lens whose planar shape is semicircle may be used. In this case, the lens may be formed on the substrate 11 monolithically. The material of the lens to be used herein can be a transparent material such as $SiO_2$ but it also can be semiconductor. For instance, the semiconductor layer of the semiconductor laser and the lens may have the same layered structure.

Embodiment 3

Figure 12A:
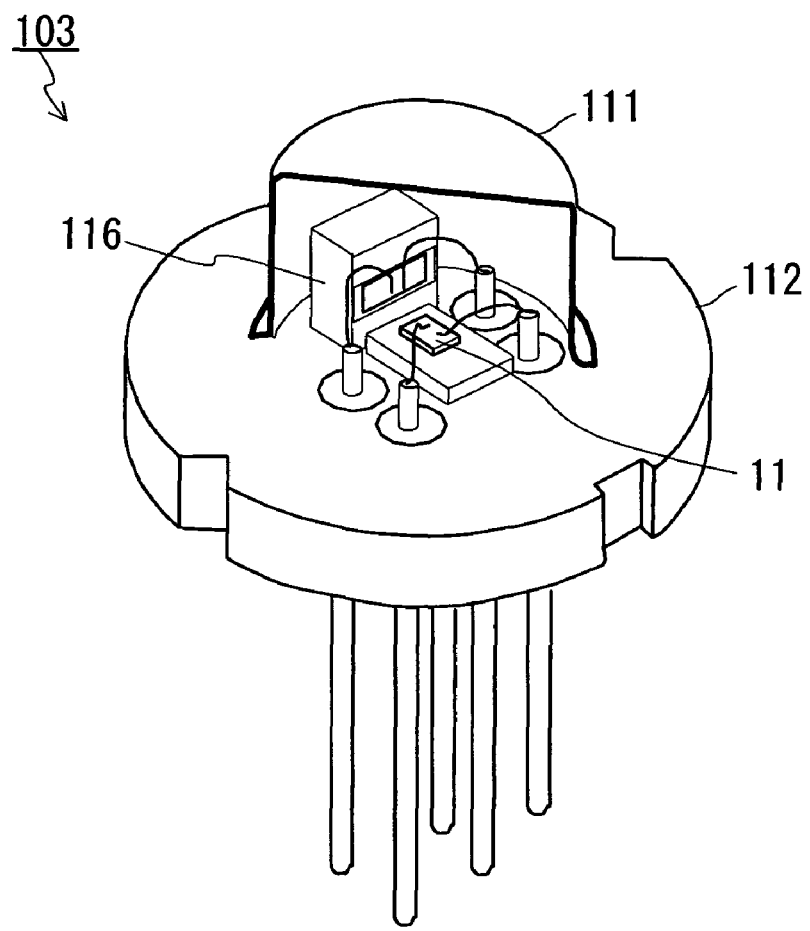
FIG. 12A is a perspective view that schematically shows the whole of still another example of the semiconductor laser gyro according to the present invention.
Figure 12B:
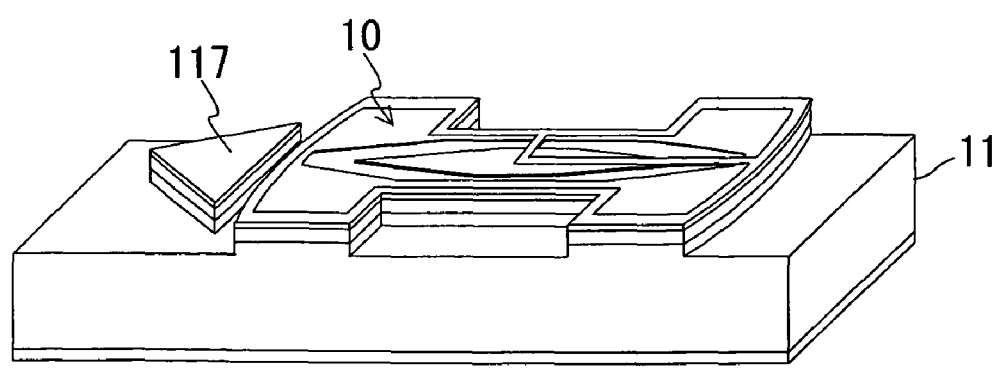
FIG. 12B is a perspective view showing a main part of FIG. 12A.

In Embodiment 3, the description is directed to an example of the semiconductor laser gyro in which a semiconductor laser and a prism are formed monolithically. FIG. 12A shows a perspective view of a gyro 103 according to Embodiment 3. FIG. 12B shows a perspective view of a substrate 11 on which a semiconductor laser 10 and a prism 117 are formed.

The gyro 103 includes a stem 112, the semiconductor laser 10 and a two-channel photodetector 116 that are disposed on the stem 112, and the prism 117 formed on the substrate 11. The prism 117 has the same layered structure as that of the semiconductor layer 20 of the semiconductor laser 10. The prism 117 and the semiconductor laser 10 are formed monolithically. Hence, the prism 117 can be formed simultaneously in forming the semiconductor layer 20.

Figure 13:
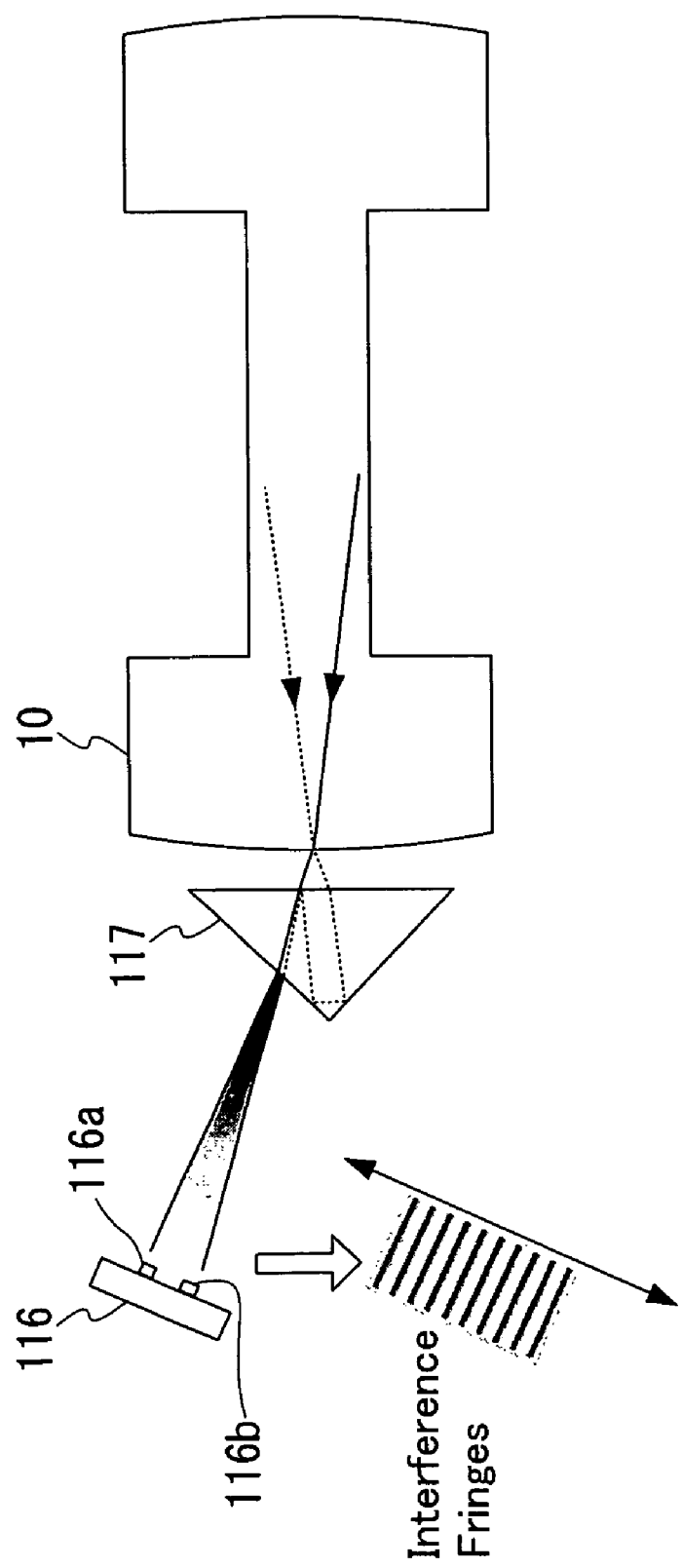
FIG. 13 is a schematic view showing optical paths of laser lights in the semiconductor laser gyro shown in FIG. 12.

FIG. 13 schematically shows optical paths of two laser lights in the gyro 103. The two laser lights emitted from the semiconductor laser 10 are superimposed on each other in the prism 117 to generate interference fringes. The movement of the interference fringes is observed with two light-sensitive elements 116a and 116b of the photodetector 116. The interference fringes move in the directions indicated with the arrow at a speed corresponding to the rotational speed of the gyro 103. The direction in which the interference fringes move varies according to the direction in which the gyro 103 rotates.

The shape of the prism 117 is determined according to conditions such as angles of the two incident laser lights, the interval therebetween, the distance from the photodetector 116, etc. In order to increase the cycle length of the interference fringes, it is preferable that the largest angle of the triangle that is a cross-sectional shape of the prism 117 be slightly larger than 90° (0.5π radian). If that angle is (0.5π+∈) radian, it is preferably that ∈ be 0.5 radian or smaller.

Embodiment 4

Figure 14A:
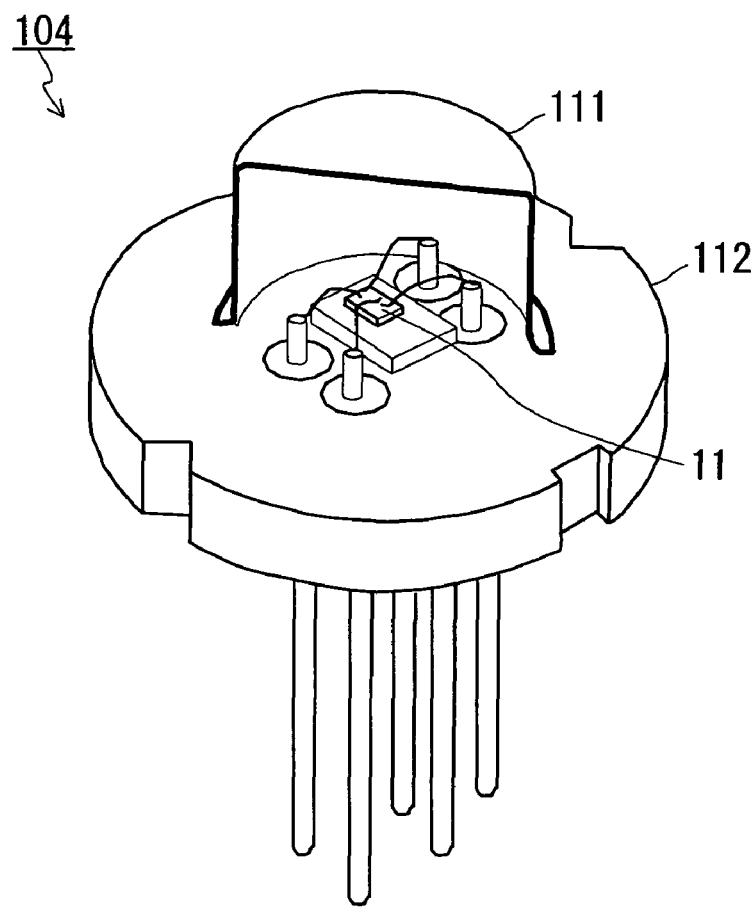
FIG. 14A is a perspective view that schematically shows the whole of yet another example of the semiconductor laser gyro according to the present invention.
Figure 14B:
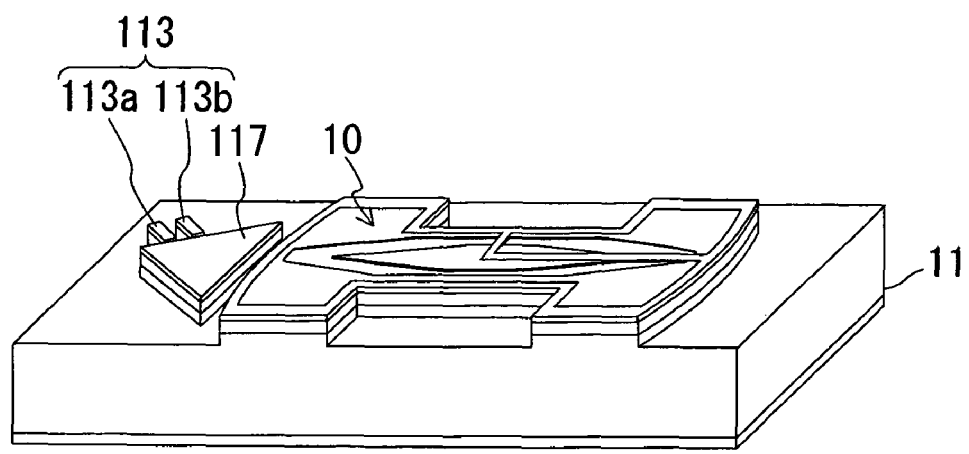
FIG. 14B is a perspective view showing a main part of FIG. 14A.

In Embodiment 4, the description is directed to an example of the semiconductor laser gyro in which a semiconductor laser, a prism, and a photodetector are formed monolithically. FIG. 14A shows a perspective view of a gyro 104 according to Embodiment 4. FIG. 14B shows a perspective view of the main part thereof.

A semiconductor laser 10, a prism 117, and a photodetector 113 (light-sensitive elements 113a and 113b) are formed on a substrate 11 monolithically. In the gyro 104, two laser lights that travel on optical paths similar to those shown in FIG. 13 form interference fringes.

A semiconductor layer 20 of the semiconductor laser 10, semiconductor layers of the light-sensitive elements 113a and 113b, and the prism 117 have the same layered structure. They can be formed simultaneously in the process of forming the semiconductor layer 20. Hence, they can be manufactured easily. Furthermore, since they can be formed by a semiconductor process, they can be formed in accurate positions and shapes. It also is possible that the prism 117 alone is formed using another material such as, for instance, $SiO_2$.

Method of Manufacturing Semiconductor Laser Gyro

The method of manufacturing a semiconductor laser that is used in the gyro of the present invention is not limited. It can be manufactured by a well-known semiconductor manufacturing technique. The gyro of the present invention can be manufactured easily by assembling a semiconductor laser and other members by a well-known technique. An example of the method of manufacturing a semiconductor laser 10 is described below.

FIGS. 15(a) to (h) schematically show manufacturing steps. In FIGS. 15(a) to (h), in order to facilitate understanding of how an insulating layer 12 is formed, the surface of the insulating layer 12 is hatched.

Figure 15:
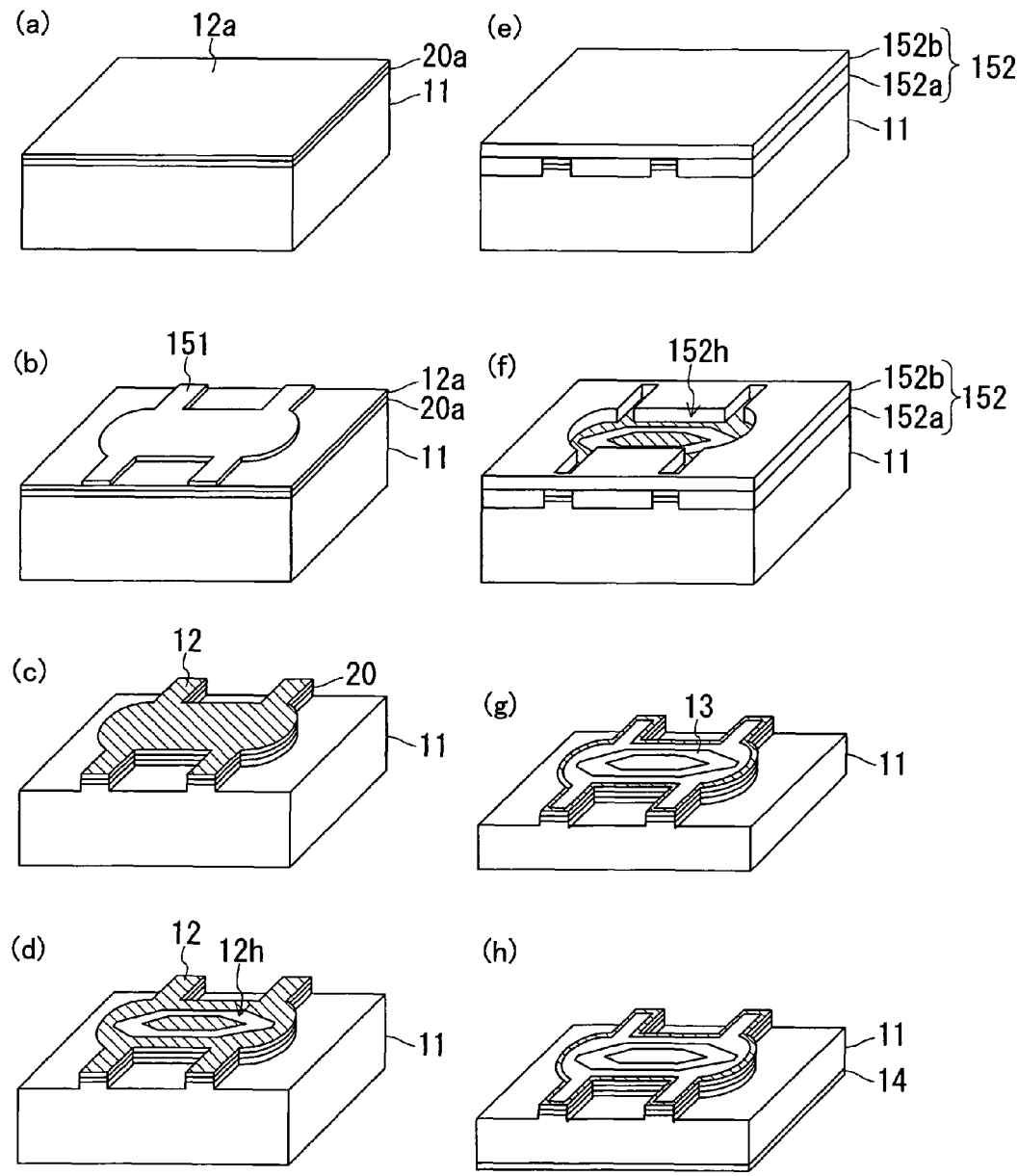
FIG. 15 shows perspective views that schematically show an example of steps for manufacturing a semiconductor laser that is employed in a semiconductor laser gyro of the present invention.
Figure 16:
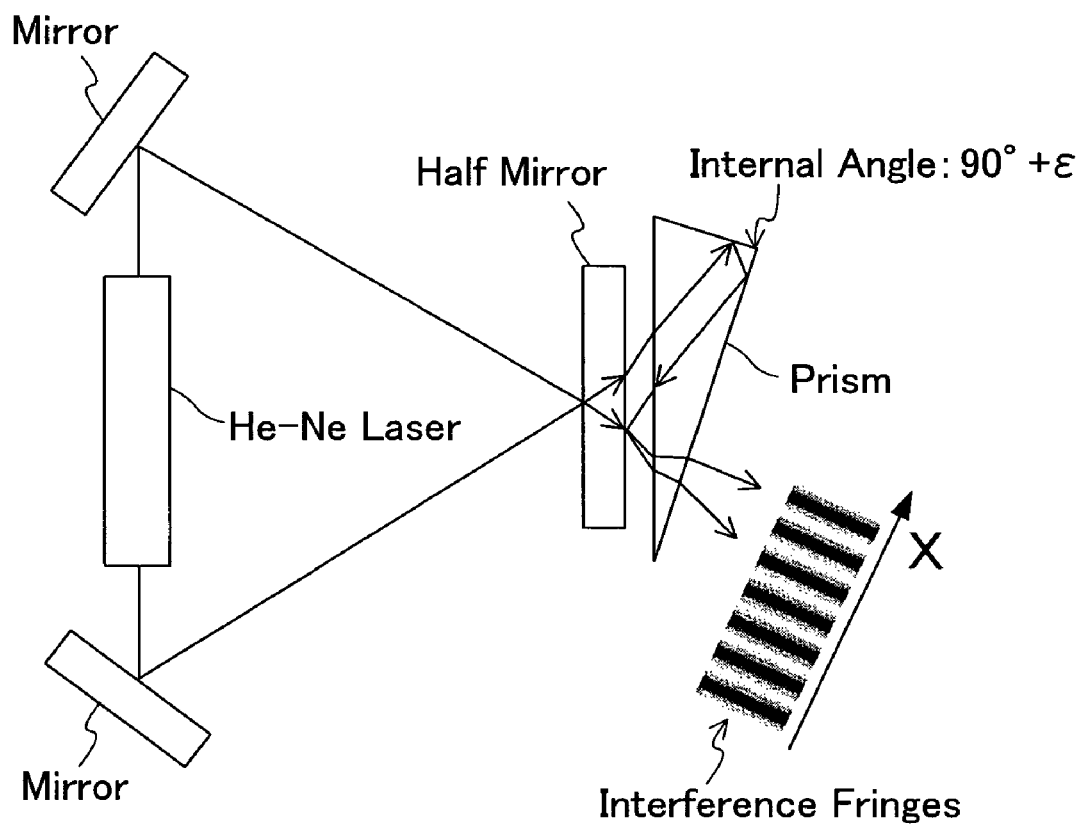
FIG. 16 is a schematic view showing the configuration of a conventional optical gyro.

First, as shown in FIG. 15(a), a semiconductor layer 20a composed of a plurality of semiconductor layers and an insulating layer 12a with a thickness of 0.4 μm are formed on a substrate 11. The semiconductor layer 20a is a layer that will be etched to form the semiconductor layer 20 (see FIG. 2 and Table 1). The respective layers of the semiconductor layer 20a can be formed by a general method, for instance, a molecular beam epitaxy (MBE) method or a chemical vapor deposition (CVD) method. The insulating layer 12a is formed of, for example, $Si_3N_4$ or $SiO_2$. The insulating layer 12a can be formed by a method such as a sputtering method or the CVD method.

Next, as shown in FIG. 15(b), a patterned resist film 151 is formed on the insulating layer 12a. The resist film 151 is patterned into the shape of the active layer 26 shown in FIG. 3.

Subsequently, as shown in FIG. 15(c), parts of the insulating layer 12a, the semiconductor layer 20a, and the substrate 11 are etched using the resist film 151 as a mask. Thereafter, the resist film 151 is removed. The etching is carried out by a reactive ion etching (RIE) method. The parts are etched up to at least the depth of the cladding layer 24. Thus, the insulating layer 12 and the semiconductor layer 20 that have a specific shape are formed by the etching. The etching is carried out under the conditions that allow the side faces of the semiconductor layer 20 to have higher smoothness and perpendicularity. Such conditions generally have been employed in the semiconductor manufacturing process. The etching allows all the semiconductor layers that compose the semiconductor layer 20 to have the same planar shape as that of the active layer 26 shown in FIG. 3. Furthermore, the side faces of the semiconductor layer 20 functions as mirror surfaces.

Next, as shown in FIG. 15(d), a through hole 12h with an approximately rhombic shape is formed in the insulating layer 12 in such a manner as to correspond to a region 31 (see FIGS. 2 and 4). The through hole 12h can be formed by a common photolithography-etching process.

Next, as shown in FIG. 15(e), a resist film 152 is formed to cover the whole surface of the substrate 11. In this case, in order to fill the difference in level between the surface of the substrate 11 and the surface of the insulating layer 12, it is preferable that the resist film 152 be formed of two layers, a resist layer 152a and a resist layer 152b. The resist layer 152a is applied to the whole surface of the substrate 11 to fill the difference in level. After that, the resist layer 152b is applied. Thus the resist film 152 is formed. This method makes it possible to form the resist film 152 whose surface has high flatness.

Subsequently, as shown in FIG. 15(f), the resist film 152 is patterned and thereby a through hole 152h is formed in the resist film 152. The through hole 152h is formed into a shape that corresponds to a region where the first electrode 13 is to be formed. After the formation of the through hole 152h, the surface of the semiconductor layer 20 (the cap layer 29) located inside the through hole 152h is etched by around 0.01 μm to 0.02 μm so that excellent contact is obtained between the semiconductor layer 20 (the cap layer 29) and the first electrode 13.

Next, as shown in FIG. 15(g), the first electrode 13 is formed. The first electrode 13 can be formed by a lift-off process. Specifically, first, a plurality of metal layers that compose the first electrode 13 are formed sequentially by an electron beam method, with the resist film 152 being used as a mask. Thereafter, the resist film 152 is removed with acetone. Thus the first electrode 13 with the specific shape can be formed. The first electrode 13 is in contact with the semiconductor layer 20 (the cap layer 29) through the through hole 12h formed in the insulating layer 12.

When a number of semiconductor lasers are to be formed using one substrate 11 (a wafer), it is preferable that the back face of the substrate 11 be polished so that the substrate 11 has a thickness of 100 to 150 μm, in order to facilitate the cleavage of the substrate 11.

Subsequently, as shown in FIG. 15(h), a plurality of metal layers are formed sequentially on the back face side of the substrate 11 by a deposition method. Thus a second electrode 14 is formed. Thereafter, in order to alloy the metal layers that compose the first electrode 13 and the second electrode 14, a heat treatment is carried out at 400 to 450° C. Finally, the substrate 11 is cleaved so that individual semiconductor lasers are separated from each other if necessary.

Thus, the semiconductor laser 10 is formed. When a photodiode having the same layered structure as that of the semiconductor laser 10 is to be formed monolithically, the resist films 151 and 152 may be patterned so as to have a shape correspond to the part where the semiconductor laser is to be formed and a part where the photodiode is to be formed. Similarly, when a prism having the same layered structure as that of the semiconductor layer of the semiconductor laser is to be formed, a resist film 151 may be patterned so as to have a shape corresponding to a part where the semiconductor laser is to be formed and a part where the prism is to be formed.

Moreover, besides the photodetector and the prism, other optical devices and electronic components may be formed on the substrate 11. For example, a drive circuit for driving the semiconductor laser or a circuit for processing signals outputted from the photodetector may be formed. Furthermore, a well-known technique that is used in conventional gyros further may be applied to the semiconductor laser gyro of the present invention.

INDUSTRIAL APPLICABILITY

The semiconductor laser gyro of the present invention is applicable to various apparatuses in which rotation of an object is necessary to be detected. Typical examples include an attitude control system, a navigation system, and a shake correction device. Specifically, the gyro of the present invention can be used for aircrafts such as rockets and airplanes, means of transportation such as automobiles and motorbikes, etc. Furthermore, the gyro of the present invention is subminiature and easy to handle. With such advantages, it can be used for personal digital assistants such as mobile phones and small personal computers, toys, cameras, etc.

The invention claimed is:

1. A semiconductor laser gyro comprising a photodetector and a semiconductor laser that emits first and second laser lights, wherein:
   the photodetector is disposed in a position where an interference fringe is formed by the first and second laser lights,
   the semiconductor laser includes an active layer as well as first and second electrodes for injecting a carrier into the active layer,
   the first laser light is one obtained through emission of a part of laser light (L1) that circulates on a polygonal path in the active layer,
   the second laser light is one obtained through emission of a part of laser light (L2) that circulates on the polygonal path in an opposite direction to the laser light (L1),
   the active layer has a planar shape that is not ring-shaped,
   the polygonal path is a rhombic path,
   the active layer has first to fourth end faces that are formed in positions corresponding to first to fourth corners of the rhombic path,
   internal angles of the first and second corners that oppose each other on the rhombic path are smaller than internal angles of the third and fourth corners,
   both the first and second laser lights are emitted from the first end face that is formed in a position corresponding to the first corner, and
   a region where the first electrode and a semiconductor layer of the semiconductor laser are in contact with each other is formed into an approximately rhombic shape corresponding to the rhombic path.

2. The semiconductor laser gyro according to claim 1, wherein a diagonal line extending between the first corner and the second corner is not parallel with the first and second laser lights.

3. The semiconductor laser gyro according to claim 1, wherein the active layer satisfies a condition under which the laser light (L1) and the laser light (L2) are reflected totally by the third and fourth end faces.

4. The semiconductor laser gyro according to claim 1, wherein the first and second end faces are convex surfaces that curve outwards, respectively.

5. The semiconductor laser gyro according to claim 4, wherein the active layer includes a first region including the rhombic path and a second region that adjoins the first region, and
   the first region has a planar shape that is a rectangular shape whose shorter sides are convex surfaces that curve outwards.

6. The semiconductor laser gyro according to claim 5, wherein the planar shape of the active layer that is formed of the first region and the second region is substantially the shape of a letter H.

7. The semiconductor laser gyro according to claim 6, wherein a formula of $L/4<Ls$ holds, where Ls denotes a length ($\mu$m) of the second region in a direction parallel to a diagonal line extending between the first corner and the second corner, while L indicates a distance ($\mu$m) between the first corner and the second corner.

8. The semiconductor laser gyro according to claim 1, wherein the photodetector includes a plurality of light-sensitive elements.

9. The semiconductor laser gyro according to claim 1, wherein the semiconductor laser and the photodetector are formed monolithically.

10. The semiconductor laser gyro according to claim 9, wherein the semiconductor laser and the photodetector have the same layered structure.

11. The semiconductor laser gyro according to claim 1, further comprising a lens,
    wherein the photodetector is disposed in a position where an interference fringe is formed by the first and second laser lights that have passed through the lens.

12. The semiconductor laser gyro according to claim 11, wherein the semiconductor laser and the lens are formed monolithically.

13. The semiconductor laser gyro according to claim 12, wherein a semiconductor layer of the semiconductor laser and the lens have the same layered structure.

14. The semiconductor laser gyro according to claim 1, further comprising a prism,
    wherein the photodetector is disposed in a position where an interference fringe is formed by the first and second laser lights that have passed through the prism.

15. The semiconductor laser gyro according to claim 14, wherein the semiconductor laser and the prism are formed monolithically.

16. The semiconductor laser gyro according to claim 15, wherein a semiconductor layer of the semiconductor laser and the prism have the same layered structure.

17. The semiconductor laser gyro according to claim 14, wherein the semiconductor laser, the prism, and the photodetector are formed monolithically.

18. The semiconductor laser gyro according to claim 17, wherein a semiconductor layer of the semiconductor laser, the prism, and a semiconductor layer of the photodetector have the same layered structure.

19. The semiconductor laser gyro according to claim 1, wherein the semiconductor laser includes two cladding layers that are disposed to sandwich the active layer, and
    each of the cladding layers has a same planar shape as that of the active layer.

* * * * *